(12) United States Patent
Nohara et al.

(10) Patent No.: US 7,686,738 B2
(45) Date of Patent: Mar. 30, 2010

(54) POWERTRAIN CONTROL APPARATUS AND METHOD

(75) Inventors: Hideharu Nohara, Okazaki (JP); Koki Minamikawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 270 days.

(21) Appl. No.: 11/970,115

(22) Filed: Jan. 7, 2008

(65) Prior Publication Data

US 2008/0176710 A1 Jul. 24, 2008

(30) Foreign Application Priority Data

Jan. 10, 2007 (JP) ............... 2007-002355

(51) Int. Cl.
*F16H 61/08* (2006.01)
*B60K 1/02* (2006.01)
*B60W 10/04* (2006.01)
*F16H 61/26* (2006.01)

(52) U.S. Cl. ............... 477/143; 477/3; 477/109; 477/159

(58) Field of Classification Search ............... 477/3, 477/109, 143, 156, 158, 159; 180/65.285
See application file for complete search history.

(56) References Cited

U.S. PATENT DOCUMENTS

| | | | | |
|---|---|---|---|---|
| 2003/0109357 A1* | 6/2003 | Tabata | ............ | 477/109 |
| 2004/0192500 A1* | 9/2004 | Tokura et al. | ............ | 477/109 |
| 2005/0101435 A1* | 5/2005 | Cowan | ............ | 477/83 |
| 2008/0051254 A1* | 2/2008 | Satou et al. | ............ | 477/109 |
| 2008/0081736 A1* | 4/2008 | Chen | ............ | 477/116 |

FOREIGN PATENT DOCUMENTS

| | | |
|---|---|---|
| JP | 63-090635 A | 4/1988 |
| JP | 03-129165 A | 6/1991 |
| JP | 5-263911 A | 10/1993 |
| JP | 07-139382 A | 5/1995 |
| JP | 08-175229 A | 7/1996 |
| JP | 9-196158 A | 7/1997 |
| JP | 09-296745 A | 11/1997 |
| JP | 10-019115 A | 1/1998 |
| JP | 10-184410 A | 7/1998 |
| JP | 2004-314842 A | 11/2004 |
| JP | 2005-133920 A | 5/2005 |

* cited by examiner

*Primary Examiner*—Roger Pang
(74) *Attorney, Agent, or Firm*—Sughrue Mion, PLLC

(57) ABSTRACT

Hydraulic pressure supplied to a first brake and a second brake in a transmission is controlled during an upshift such that the second brake releases from an applied state, and the first brake applies from a released state. The hydraulic pressure supplied to the first brake is increased to a standby pressure. When a period of time has passed after the upshift starts, the output torque of a powertrain is increased. The standby pressure is corrected according to a decrease rate of an input shaft rotation speed of the transmission during an inertia phase of the upshift. An ECU executes a program that includes the step of setting the period of time from the start of the upshift until the output torque of the powertrain starts to increase, according to the standby pressure.

7 Claims, 8 Drawing Sheets

POWERTRAIN CONTROL APPARATUS AND METHOD

INCORPORATION BY REFERENCE

The disclosure of Japanese Patent Application No. 2007-002355 filed on Jan. 10, 2007, including the specification, drawings and abstract is incorporated herein by reference in its entirety.

BACKGROUND OF THE INVENTION

1. Field of the Invention

The invention relates to a control apparatus and control method of a powertrain. More particularly, the invention relates to technology that controls output torque of a powertrain during a shift in a transmission.

2. Description of the Related Art

A transmission is known that automatically establishes speeds according to the combination of friction apply elements that are to be applied from among a plurality of friction apply elements. In such a transmission, a shift is performed by applying a friction apply element that is in a released state and releasing a different friction apply element that is in an applied state.

During an upshift in the transmission, after a torque phase in which only the torque load of the friction apply elements changes while the input shaft rotation speed remains the same, an inertia phase starts in which the input shaft rotation speed decreases. If the torque input to the transmission during the shift is constant, it is known that the output torque of the transmission will decrease during the torque phase and increase during the inertia phase. If the torque fluctuation is large, shock may be generated as a result. Therefore, in order to reduce shock during a shift (i.e., shift shock), technology has been proposed which increases the input torque of the transmission during the torque phase and decreases that input torque during the inertia phase.

Japanese Patent Application Publication No. 5-263911 (JP-A-5-263911) describes a control apparatus for an automatic transmission that reduces shift shock in a vehicle with an automatic transmission as much as possible by finely electronically controlling the engine output. This control apparatus gradually retards the ignition timing from the timing at which the shift start command was output, and then advances the ignition timing to the regular ignition timing at an appropriate time constant once the torque phase starts. When the inertia phase starts, the ignition timing is retarded to an appropriate predetermined value, and when the inertia phase ends, the ignition timing is advanced to the regular ignition timing.

According to the control apparatus described in JP-A-5-263911, after the shift command is output, the engine torque is slowly reduced so that the output torque at the start of the torque phase is reduced. At the torque phase, the engine torque can be increased. Once the inertial phase starts, the engine torque is gradually reduced so that the amount of increase in the output torque from inertia can be reduced. Accordingly, a drop in torque during the torque phase can be kept to a minimum. Also, a sudden increase in torque during the inertia phase can also be suppressed. As a result, shift shock can be reduced.

Incidentally, in order to achieve good shift characteristics, the hydraulic pressure to be supplied to the friction apply elements during shifting is not constant. For example, when the friction apply elements become worn, more pressure is needed to obtain the same apply force. Therefore, in a transmission the hydraulic pressure supplied to the friction apply elements is corrected based on such factors as the rate of change in the input shaft rotation speed during shifting. For example, if the rate of decrease in the input shaft rotation speed is less than a preset rate of decrease, the friction apply element is considered to be worn so the hydraulic pressure supplied to that friction apply element when it is to be applied for a shift is increased.

Increased hydraulic pressure will cause the torque phase to start earlier during an upshift. Therefore, even if the engine torque is increased during the torque phase, as it is with the control apparatus described in JP-A-5-263911, the lag between the timing at which the torque phase starts and the timing at which the engine torque increases may increase. In this case, even if the engine torque is increased, the range of the decrease in the output torque may increase. As a result, the shock that may be generated during the shift may increase. In JP-A-5-263911, however, there is no mention whatsoever of this kind of problem.

SUMMARY OF THE INVENTION

This invention thus provides a control apparatus and a control method for a powertrain, which can reduce shock that may be generated during a shift.

A first aspect of the invention relates to a control apparatus of a powertrain that shifts from first speed to second speed by applying a first friction apply element that is in a released state and releasing a second friction apply element that is in an applied state. This control apparatus includes a hydraulic pressure controlling portion which, during a shift, increases hydraulic pressure supplied to the first friction apply element to a preset standby pressure; a standby pressure correcting portion that corrects the standby pressure based on the state of the transmission; and an output torque controlling portion that controls, according to the standby pressure, output torque of the powertrain during a shift in the transmission.

In the first aspect, a transmission shifts speeds by applying a first friction apply element that is in a released state and releasing a second friction apply element that is in an applied state. During a shift, the hydraulic pressure supplied to the first friction apply element is increased to a preset standby pressure which is corrected based on the state of the transmission, and the output torque of the powertrain during a shift in the transmission is controlled according to this standby pressure. Accordingly, increasing and decreasing the standby pressure enables the timing or gradient or the like at which the output torque of the powertrain is increased to be changed if the timing at which the torque phase of the upshift starts is changed. Therefore, the lag between the timing at which the torque phase starts and timing at which the output torque is increased can be reduced. As a result, a fluctuation in output torque during the shift can be reduced, thereby enabling shock (i.e., shift shock) to be reduced.

In the first aspect, the output torque controlling portion may include a torque increasing portion that increases the output torque of the powertrain during a shift in the transmission, and an output timing setting portion that makes the timing at which the output torque of the powertrain is increased earlier when the standby pressure is high than when the standby pressure is low.

In this kind of control apparatus, the output torque of the powertrain during a shift in the transmission is controlled so that it increases. Also, the timing at which the output torque of the powertrain is increased is earlier when the standby pressure is high than when the standby pressure is low. Accordingly, increasing the standby pressure enables the output torque to be increased early if the torque phase of the upshift starts early. Therefore, the lag between the timing at which the torque phase starts and the timing at which the output torque is increased can be reduced. As a result, a fluctuation in output torque during the shift can be reduced, thereby enabling shock (i.e., shift shock) to be reduced.

In the first aspect, the output torque controlling portion may include a torque increasing portion that increases the output torque of the powertrain during a shift in the transmission, and an output gradient setting portion that makes a gradient at which the output torque of the powertrain increases larger when the standby pressure is high than the gradient when the standby pressure is low.

In this kind of control apparatus, the output torque of the powertrain during a shift in the transmission is increased. Also, the gradient at which the output torque is increased is made larger when the standby pressure is high than when the standby pressure is low. Accordingly, increasing the standby pressure enables the output torque of the powertrain to be quickly increased if the torque phase of the upshift starts early. Therefore, the lag between the timing at which the torque phase starts and the timing at which the output torque is increased can be reduced. As a result, a fluctuation in output torque during the shift can be reduced, thereby enabling shock (i.e., shift shock) to be reduced.

In the first aspect, the standby pressure correcting portion may correct the standby pressure such that the standby pressure increases when a decrease rate of an input shaft rotation speed of the transmission is less than a preset decrease rate.

With this kind of control apparatus, the standby pressure is corrected so that it increases when the decrease rate of the input shaft rotation speed of the transmission is less than a preset decrease rate. As a result, an upshift can be performed in a shorter amount of time.

A second aspect of the invention relates to a powertrain control method that includes increasing hydraulic pressure supplied to a first friction apply element to a preset standby pressure during a shift in a transmission that shifts speeds by applying the first friction apply element that is in a released state and releasing a second friction apply element that is in an applied state; correcting the standby pressure based on the state of the transmission; and controlling, according to the standby pressure, output torque of the powertrain during a shift in the transmission.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 6 is a timing chart showing the change in the hydraulic pressure supplied to a B1 brake during an upshift and the like;

DETAILED DESCRIPTION OF THE EMBODIMENTS

Figure 1:
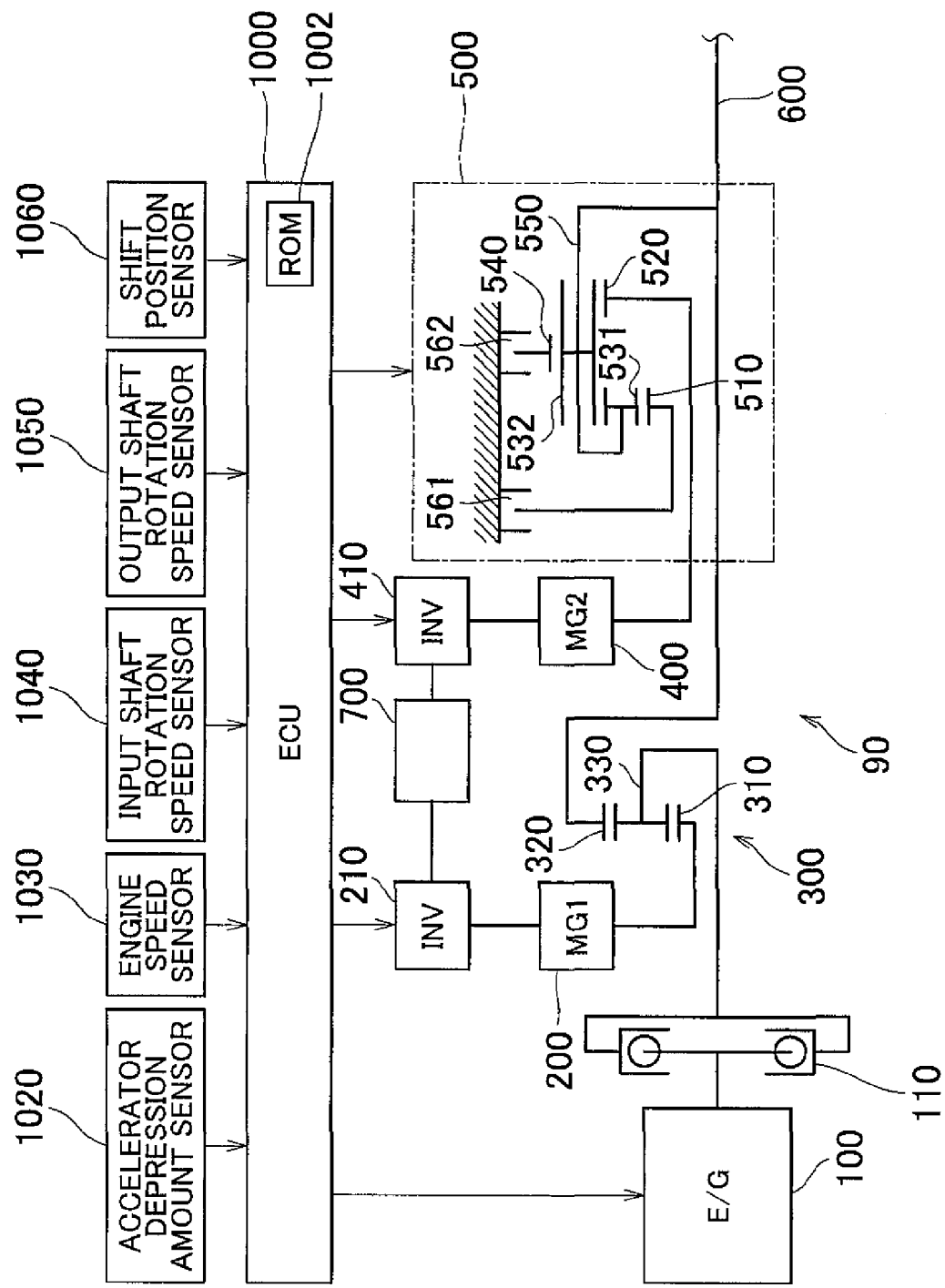
FIG. 1 is a block diagram schematically showing a powertrain of a hybrid vehicle.

Hereinafter, example embodiments of the invention will be described in detail with reference to the accompanying drawings. In the following description, like parts will be denoted by like reference numerals. Like parts will also be referred to by the same nomenclature and will have the same function. Therefore, detailed descriptions of those parts will not be repeated.

A powertrain of a hybrid vehicle provided with a control apparatus according to one example embodiment of the invention will be described with reference to FIG. 1. Incidentally, the control apparatus according to this example embodiment may be realized by, for example, an ECU (Electronic Control Unit) 1000 executing programs that are stored in ROM (Read Only Memory) 1002.

As shown in FIG. 1, a powertrain 90 mainly includes an engine 100, a MG (motor-generator) (1) 200, a power split device 300 that combines or divides torque from or between the engine 100 and the MG (1), a MG (2) 400, and a transmission 500.

The engine 100 is a well-known power unit such as a gasoline engine or a diesel engine that outputs power by burning fuel, and in which the operating state such as the throttle opening amount (i.e., the intake air amount), the fuel supply amount, and the ignition timing can be electrically controlled. This control is performed, for example, by the ECU 1000 which has a microcomputer as its main component.

The MG (1) 200 is a three-phase alternating current rotating electrical machine, for example, which can function both as an electric motor and a generator. The MG (1) 200 is connected to a power storage device 700 such as a battery via an inverter 210. The output torque or regenerative torque of the MG (1) 200 can be set appropriately by controlling the inverter 210. This control is performed by the ECU 1000. Incidentally, a stator, not shown, of the MG (1) 200 is fixed so as not to be able to rotate.

The power split device 300 is a well-known gear mechanism in which differential operation is possible using three rotating elements: i) a sun gear (S) 310 which is a gear with external teeth, ii) a ring gear (R) 320 which is a gear with internal teeth that is arranged to the radial outside of, and on the same axis as, the sun gear (S) 310, and iii) a carrier (C) 330 that rotatably and revolvably retains pinion gears that are in mesh with the sun gear (S) 310 and the ring gear (R) 320. An output shaft of the engine 100 is connected via a damper 110 to the carrier (C) 330 that serves as a first rotating element. That is, the carrier (C) 330 is an input element.

In contrast, a rotor, not shown, of the MG (1) 200 is connected to the sun gear (S) 310 that serve as a second rotating element. Therefore, the sun gear (S) 310 is a so-called reaction force element. Also, the ring gear (R) 320 which is a third rotating element is an output element. This ring gear (R) 320 is connected to an output shaft 600 which is connected to driving wheels, not shown.

Figure 2:
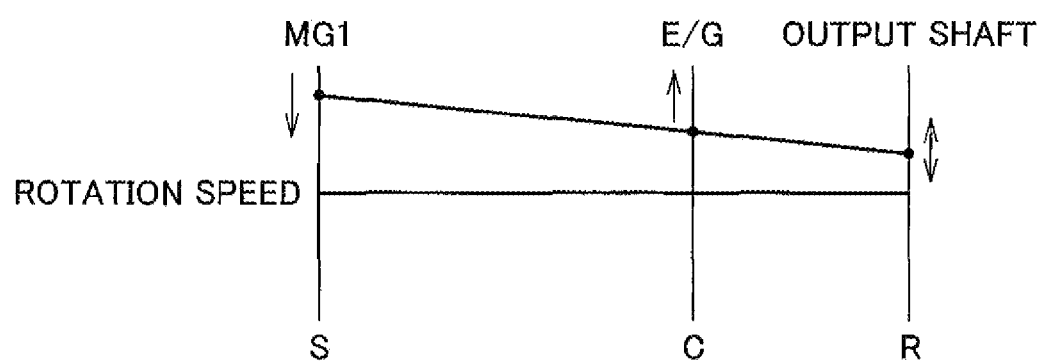
FIG. 2 is an alignment graph of a power split device.

FIG. 2 is an alignment graph of the power split device 300. As shown in FIG. 2, when reaction torque from the MG (1) 200, with respect to the torque output by the engine 100 and input to the carrier (C) 330, is input to the sun gear (S) 310, the resultant or adjusted torque (i.e., the sum of or difference between the reaction torque from the MG (1) 200 and the torque output by the engine 100 and input to the carrier (C) 300) is output from the ring gear (R) 320 which is the output element. In this case, the rotor of the MG (1) 200 is rotated by that torque and the MG (1) 200 functions as a generator. Also, when the rotation speed (i.e., the output rotation speed) of the ring gear (R) 320 is constant, the speed of the engine 100 can be changed continuously (i.e., in a non-stepped manner) by changing (i.e., increasing or decreasing) the rotation speed of the MG (1) 200. That is, control which sets the speed of the engine 100 to achieve the best fuel efficiency, for example, can be performed by controlling the MG (1) 200. This control is performed by the ECU 1000.

If the engine 100 is shut off during while the vehicle is running, the MG (1) 200 rotates in reverse. When the MG (1) 200 is made to function as an electric motor in this state and output forward torque as a result, that torque acts on the engine 100, which is connected to the carrier (C) 330, thus causing the engine 100 to rotate in the forward direction. Accordingly, the engine 100 can be started (i.e., motoring or cranking of the engine 100 is possible) by the MG (1) 200. In this case, torque in the direction which stops that rotation acts on the output shaft 600. Accordingly, driving torque for running can be maintained by controlling the torque that is output from the MG (2) 400, and at the same time, startup of the engine 100 can be performed smoothly. Incidentally, this type of hybrid is referred to as a mechanical distribution or split type.

Returning now to FIG. 1, the MG (2) 400 is a three-phase alternating current rotating electrical machine, for example, which can function both as an electric motor and a generator. The MG (2) 400 is connected to a power storage device 700 such as a battery via an inverter 410. The torque both when driving (i.e., providing power) and regenerating energy is controlled by controlling the inverter 410. Incidentally, a stator, not shown, of the MG (2) 400 is fixed so as not to be able to rotate.

The transmission 500 consists of a Ravigneaux planetary gear set. This gear set has two sun gears, i.e., a first sun gear (SI) 510 and a second sun gear (S2) 520, both of which are gears with external teeth. A first pinion 531 is in mesh with the first sun gear (S1) 510 as well as a second pinion 532. This second pinion 532 is in mesh with a ring gear (R) 540 which has the same axial center as the sun gears 510 and 520.

Incidentally, the first pinion 531 and the second pinion 532 are both rotatably and revolvably retained by a carrier (C) 550. Also, the second sun gear (S2) 520 is in mesh with the second pinion 532. Accordingly, the first sun gear (Si) 510 and the ring gear (R) 540, together with the first pinion 531 and the second pinion 532, make up a mechanism that corresponds to a double pinion type planetary gear set. Also, the second sun gear (S2) 520 and the ring gear (R) 540, together with the second pinion 532, make up a mechanism that corresponds to a single pinion type planetary gear set.

Further, the transmission 500 includes a B1 brake 561 that selectively fixes the first sun gear (S1) 510 and a B2 brake 562 that selectively fixes the ring gear (R) 540. The B1 brake 561 and the B2 brake 562 are so-called friction apply elements that produce apply force by frictional force. These brakes 561 and 562 may be multiple disc apply devices or band type apply devices. Also, the B1 brake 561 and the B2 brake 562 are structured so that their torque capacities change continuously (i.e., in a non-stepped manner) according to the apply force from hydraulic pressure. Moreover, the MG (2) 400 is connected to the sun gear (S2) 520, and the carrier (C) 550 is connected to the output shaft 600.

Therefore, in this transmission 500 the second sun gear (S2) 520 is a so-called input element, and the carrier (C) 550 is an output element. A high speed H in which the speed ratio is greater than 1 is established by applying the B1 brake 561, and a low speed L which has a greater speed ratio than the high speed H is established by applying the B2 brake 562 instead of the B1 brake 561.

The shift between these speeds is executed based on the running state such as the vehicle speed and the required driving force (or accelerator depression amount). More specifically, a shift speed region is set in advance in the form of a map (i.e., a shift map) and control is performed to establish one of the speeds according to the detected operating state.

Figure 3:
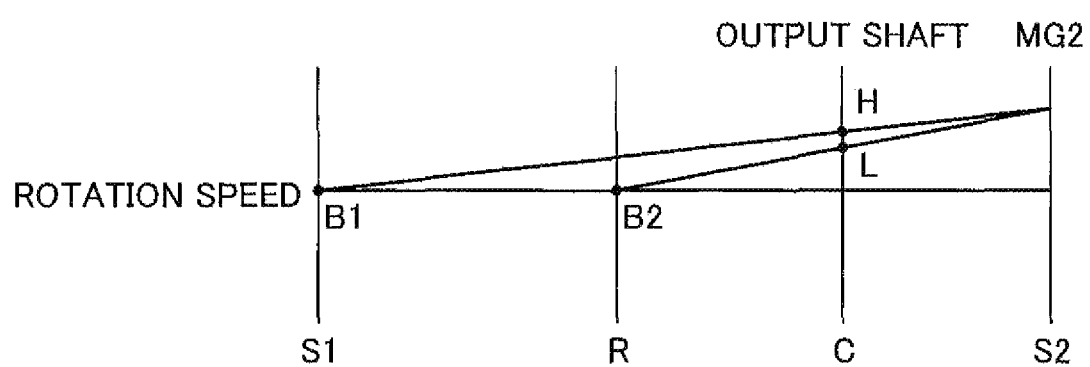
FIG. 3 is an alignment graph of a transmission.

FIG. 3 is an alignment graph of the transmission 500. As shown in FIG. 3, when the ring gear (R) 540 is fixed by the B2 brake 562, the low speed L is established and the torque output from the MG (2) 400 is multiplied according to the speed ratio and applied to the output shaft 600. In contrast, when the first sun gear (S1) 510 is fixed by the B1 brake 561, the high speed H which has a smaller speed ratio than the low speed L is established. Because the speed ratio of the high speed H is greater than 1, the torque output from the MG (2) 400 is increased according to that speed ratio and applied to the output shaft 600.

Incidentally, when the speeds L and H are constantly established, the torque applied to the output shaft 600 is the output torque of the MG (2) 400 that has been increased according to the speed ratio. However, during a shift transition, the torque that is applied to the output shaft 600 is affected by the torque capacities of the B1 brake 561 and the B2 brake 562 and the inertia torque that accompanies a change in rotation speed, and the like. Also, the torque that is applied to the output shaft 600 is positive torque when the MG (2) 400 is in a driving state and is negative torque when the MG (2) 400 is in a driven state.

Figure 4:
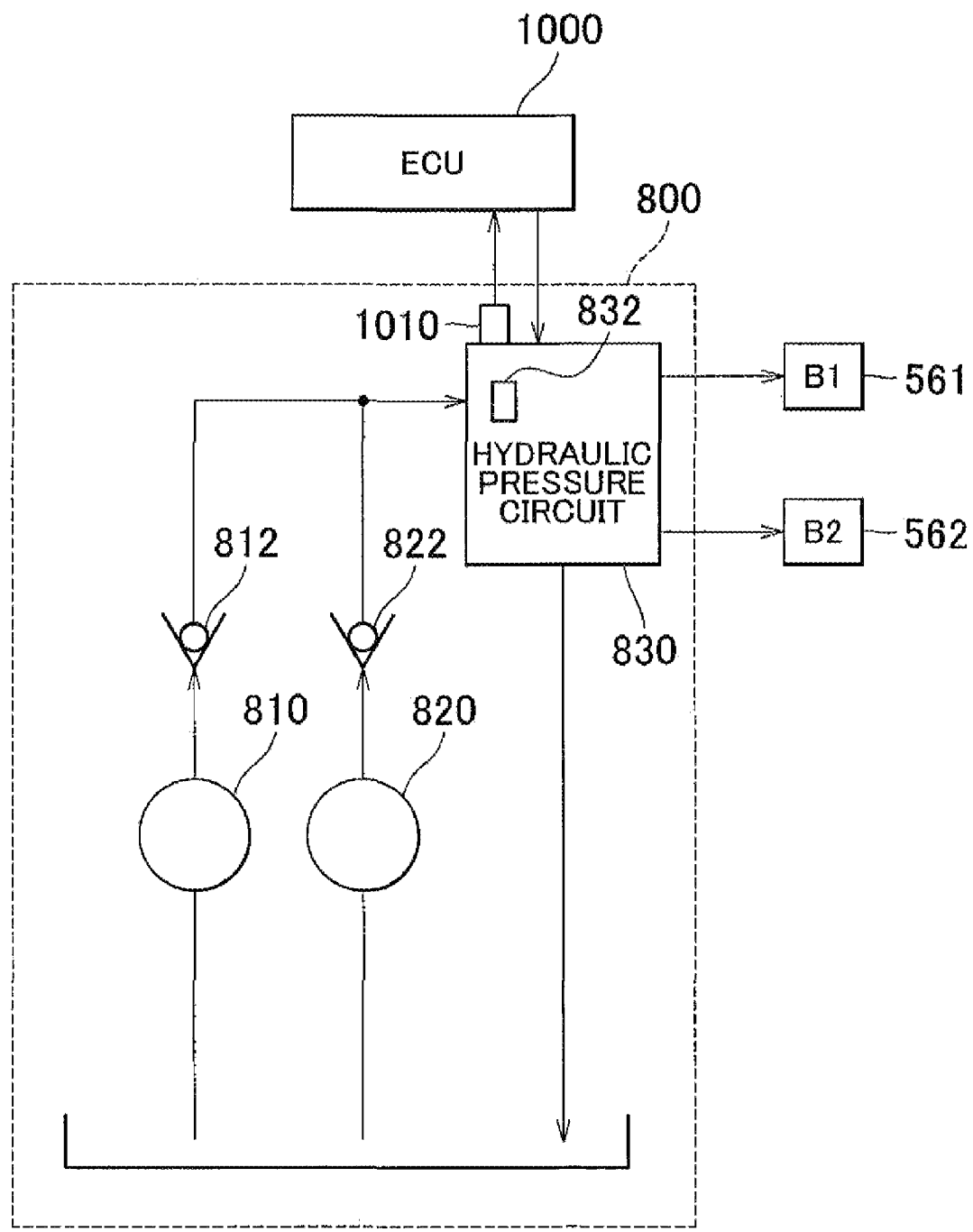
FIG. 4 is a diagram of a hydraulic pressure control apparatus of the hybrid vehicle.

This hybrid vehicle also includes a hydraulic pressure control apparatus 800, as shown in FIG. 4, that controls the application and release of the B1 brake 561 and the B2 brake 562 by supplying/draining hydraulic pressure to/from the B1 brake 561 and the B2 brake 562.

This hydraulic pressure control apparatus 800 includes a mechanical oil pump 810, an electric oil pump 820, and a hydraulic pressure circuit 830 that adjusts (regulates) the hydraulic pressure generated by those oil pumps 810 and 820 to line pressure, supplies/drains the adjusted pressure with the line pressure as the base pressure to/from the B1 brake 561 and the B2 brake 562, and supplies oil for lubrication to the appropriate locations.

The mechanical oil pump 810 is a pump that is driven by the engine 100 to generate hydraulic pressure. For example, the mechanical oil pump 810 is arranged on the same axis on the output side of the damper 110 and operates with torque from the engine 100. In contrast, the electric oil pump 820 is a pump that is driven by a motor, not shown. The electric oil pump 820 is mounted in an appropriate location on an outer portion of a casing, not shown, for example, and operates on power supplied from a power storage device such as a battery so as to generate hydraulic pressure. The electric oil pump 820 is controlled by the ECU 1000 so as to generate the desired hydraulic pressure. For example, the speed or the like of the electric oil pump 820 is feedback controlled.

The hydraulic pressure circuit 830 is provided with a plurality of solenoid valves and switching valves or regulating valves, neither of which is shown, and can electrically control the regulating pressure and the supply/discharge of hydraulic pressure. This control is performed by the ECU 1000. The temperature of the hydraulic fluid flowing through the hydraulic pressure circuit (hereinafter this temperature may also be referred to as "oil temperature") is detected by an oil temperature sensor 1010, and a signal indicative of the detected temperature is output to the ECU 1000.

On the discharge side of the oil pump 810 is provided a check valve 812, and on the discharge side of the oil pump 820 is provided a check valve 822. These check valves 812 and 822 open from the discharge pressure of the oil pumps 810 and 822 so as to allow hydraulic fluid to flow out from the oil pumps 810 and 820, and close in the opposite direction so that hydraulic fluid can not flow back into the oil pump 810 and 820 through those valves 812 and 822. Also, the oil pumps 810 and 820 are connected parallel with each other to the hydraulic pressure circuit 830.

The solenoid valve 832 that adjusts the line pressure selectively controls the line pressure to one of two states, i) a high pressure state in which the discharge amount is increased to raise the line pressure to a first hydraulic pressure P (1), and ii) a low pressure state, which is the opposite of the high pressure state, in which the discharge amount is reduced to lower the line pressure to a second hydraulic pressure P (2).

The powertrain 90 described above includes two power sources, i.e., the engine 100 and the MG (2) 400. Effectively using these enables the vehicle to be driven with greater fuel efficiency and thus reduces the amount of exhaust gas that is discharged. Also, even when driving the engine 100, the speed of the engine 100 is controlled by the MG (1) 200 to achieve optimum fuel efficiency. Furthermore, inertia energy of the vehicle during coasting is regenerated as electrical energy. When the MG (2) 400 is driven to provide torque assist while the vehicle speed is slow, the transmission 500 is set to the low speed L such that the torque applied to the output shaft 600 increases. On the other hand, at higher vehicle speeds the transmission 500 is set to the high speed H such that the rotation speed of the MG (2) relatively decreases to reduce loss. As a result, torque assist is able to be executed efficiently.

The hybrid vehicle described above is capable of running using only the power from the engine 100, using both the engine 100 and the MG (2) 400 in combination, and using only the MG (2) 400. Which of these three running modes is to be selected is determined based on, for example, the amount of driving force required as indicated by the accelerator depression amount, for example, the engine speed, the input shaft rotation speed NI of the transmission 500, the output shaft rotation speed NO of the transmission 500 (i.e., the vehicle speed), or the position (i.e., shift position) of a shift lever, not shown.

As shown in FIG. 1, the accelerator depression amount is detected by an accelerator depression amount sensor 1020. The engine speed is detected by an engine speed sensor 1030. The input shaft rotation speed NI of the transmission 500 is detected by an input shaft rotation speed sensor 1040. The output shaft rotation speed of the transmission 500 (i.e., the rotation speed of the output shaft 600) is detected by an output shaft rotation speed sensor 1050. The vehicle speed can be calculated from the output shaft rotation speed NO, and the shift position is detected by a shift position sensor 1060.

Figure 5:
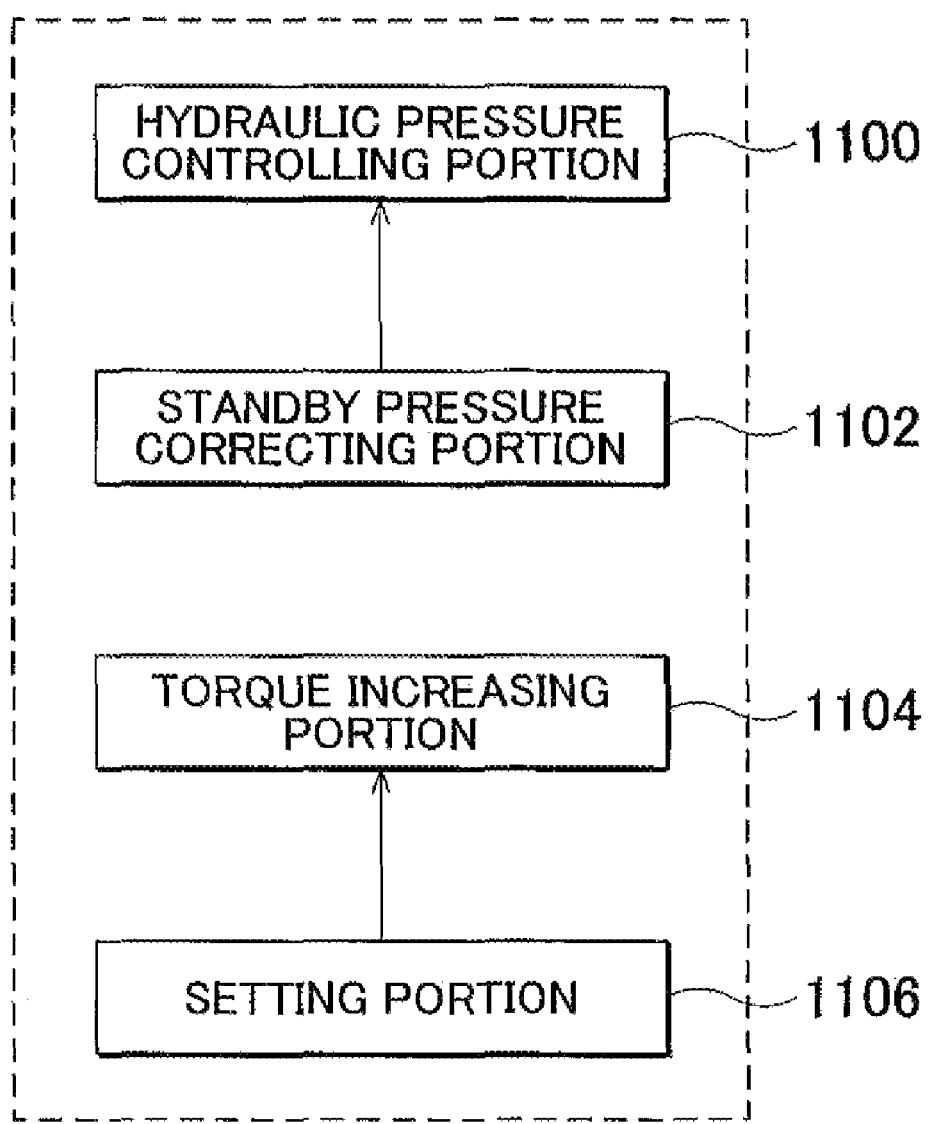
FIG. 5 is a functional block diagram of an ECU which serves as a control apparatus according to an example embodiment of the invention.

The function of the ECU 1000 which serves as the control apparatus according to this example embodiment will now be described with reference to FIG. 5. Incidentally, the functions described below may be realized by either hardware or software.

Figure 6:
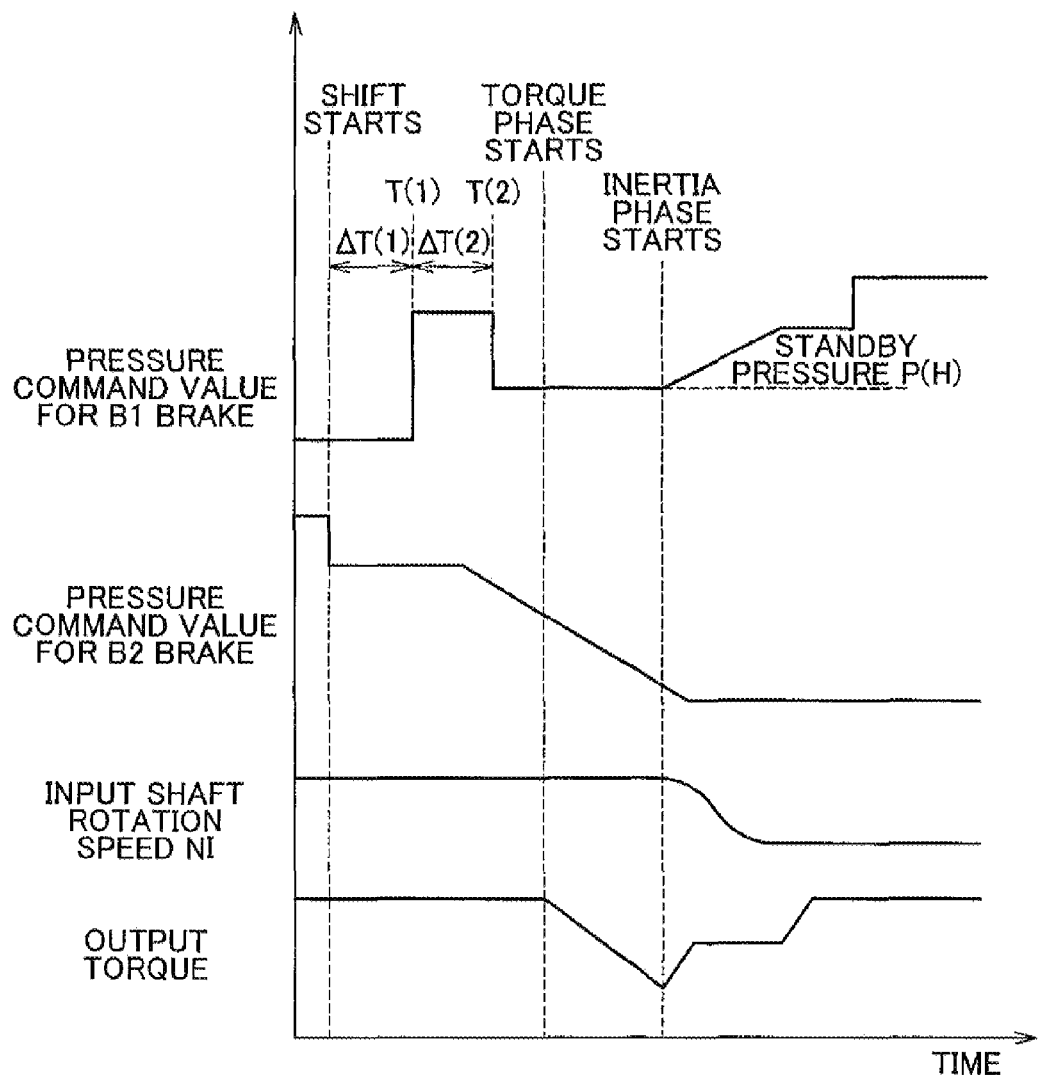

The ECU 1000 includes a hydraulic pressure controlling portion 1100, a standby pressure correcting portion 1102, a torque increasing portion 1104, and a setting portion 1106. During an upshift from the low speed L to the high speed H, the hydraulic pressure controlling portion 1100 controls the hydraulic pressure supplied to the brakes so as to release the B2 brake 562 from an applied state and apply the B1 brake 561 from a released state, as shown in FIG. 6.

The hydraulic pressure supplied to the B1 brake 561 during the upshift is once increased at time T (1) which is a preset period of time ΔT (1) after the start of the shift start (i.e., after a shift command is output).

Then at time T (2) after a preset period of time ΔT (2) has passed, the hydraulic pressure supplied to the B1 brake 561 is kept by a standby pressure P (H). This standby pressure P (H) is set to a value that is greater than the hydraulic pressure before the start of the shift and which is sufficient for starting the inertia phase. When the inertia phase starts at time T (3) while the hydraulic pressure is held at this standby pressure P (H), the hydraulic pressure is gradually increased (i.e., increased at a preset increase rate).

The standby pressure correcting portion 1102 corrects the standby pressure P (H) based on the input rotation speed NI of the transmission 500 during the inertia phase of the upshift. For example, if the decrease rate ΔNI (D) of the input rotation speed NI during the inertia phase is greater than a target decrease rate ΔNI (T) that was preset by testing or the like, then the standby pressure P (H) is corrected so that it becomes smaller. The standby pressure P (H) is corrected so as to become smaller as the decrease rate ΔNI (D) of the input rotation speed NI becomes increasingly larger than the target decrease rate ΔNI (T).

Conversely, if the decrease rate ΔNI (D) of the input rotation speed NI is less than the target decrease rate ΔNI (T), the standby pressure P (H) is corrected so that it becomes larger. The standby pressure P (H) is corrected so as to become larger as the decrease rate ΔNI (D) of the input rotation speed NI becomes increasingly smaller than the target decrease rate ΔNI (T). Incidentally, the method for correcting the standby pressure P (H) is not limited to this.

Figure 7:
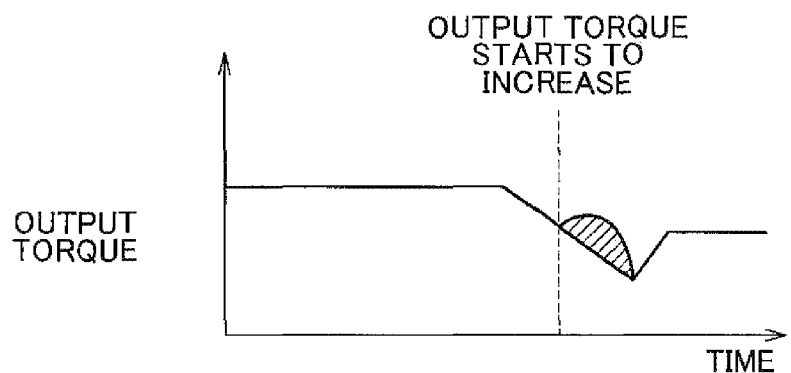
FIG. 7 is a timing chart (part 1) showing the timing at which a torque phase starts and the timing at which the output torque of the powertrain is increased.

The torque increasing portion 1104 controls at least one of the driving sources from among the engine 100, the MG (1) 200, and the MG (2) 400 such that the output torque of the powertrain 90 increases during the torque phase of the upshift, as shown by the sloped line in FIG. 7. Also, in this example embodiment, this increase in output torque starts earlier the greater the standby pressure P (H) is.

The setting portion 1106 sets a period of time ΔT (UP) from the start of the upshift (i.e., from when the shift command is output) until the output torque of the powertrain 90 starts to increase, according to the standby pressure P (H). This period of time ΔT (UP) is set shorter the larger the standby pressure P (H) is. That is, the period of time ΔT (UP) is set shorter when the standby pressure P (H) is large than it is when the standby pressure P (H) is small.

Incidentally, instead of or in addition to the period of time ΔT (UP) from the start of the upshift until the output torque of the powertrain 90 starts to increase, the gradient at which the output torque is increased may also be set according to the standby pressure P (H). In this case, the gradient may be set so as to become larger the greater the standby pressure P (H) is.

That is, the gradient may be set so that it is larger when the standby pressure P (H) is large than it is when the standby pressure P (H) is small.

Figure 8:
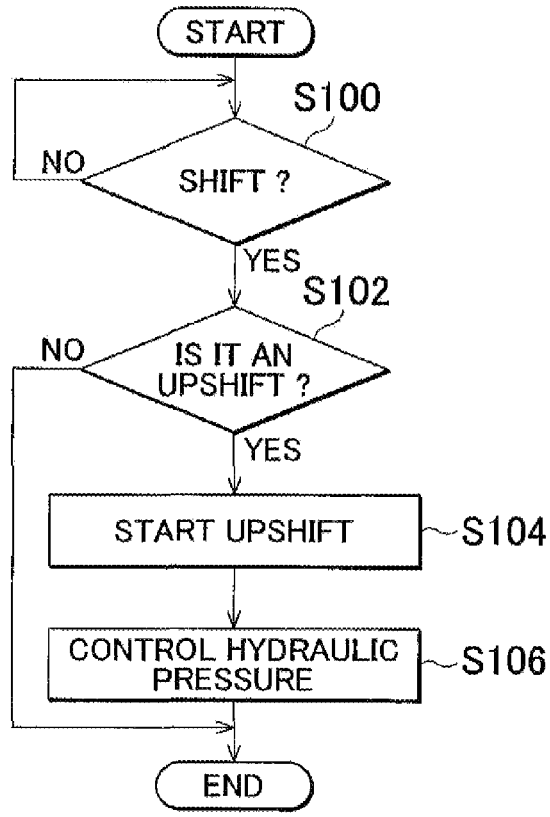
FIG. 8 is a flowchart (part 1) illustrating the control structure of a program executed by the ECU which serves as the control apparatus according to the example embodiment.

The control structure (part 1) of a program executed by the ECU 1000 which serves as the control apparatus according to this example embodiment will now be described with reference to FIG. 8.

In step S100, the ECU 1000 determines whether a shift is to be performed in the transmission 500. This determination is made based on a shift map that has the accelerator depression amount and the vehicle speed as parameters, for example. If a shift is to be performed (i.e., YES in step S100), then the process proceeds to step S102. If not (i.e., NO in step S100), then step S100 is repeated.

In step S102, the ECU 1000 determines whether the shift to be performed is an upshift. If an upshift is to be performed (i.e., YES in step S102), the process proceeds to step S104. If not (i.e., NO in step S102), this cycle of the routine directly ends.

In step S104, the ECU 1000 starts the upshift. In step S106, the ECU 1000 controls the hydraulic pressure supplied to the brakes so that the B2 brake 562 is released and the B1 brake 561 is applied. The hydraulic pressure supplied to the B1 brake 561 is increased to the standby pressure P (H), as described above. Once the inertia phase starts, the hydraulic pressure is then increased further.

Figure 9:
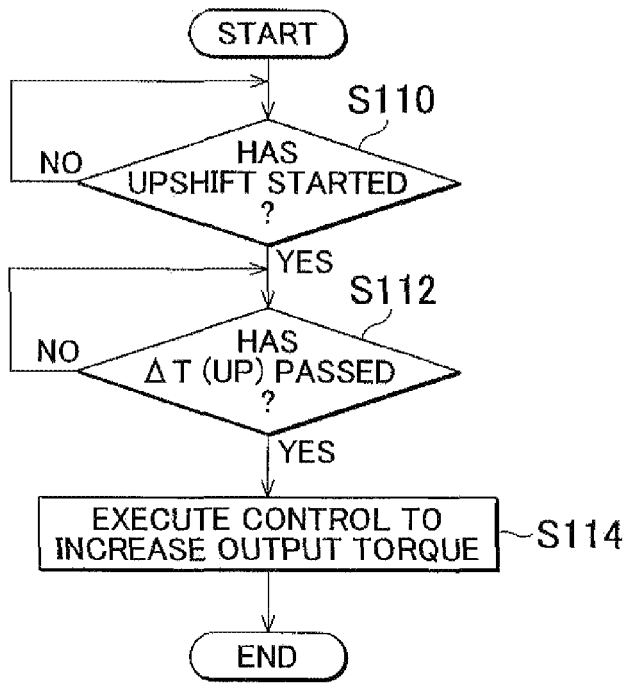
FIG. 9 is a flowchart (part 2) illustrating the control structure of a program executed by the ECU which serves as the control apparatus according to the example embodiment.

The control structure (part 2) of a program executed by the ECU 1000 which serves as the control apparatus according to this example embodiment will now be described with reference to FIG. 9.

In step S110, the ECU 1000 determines whether the upshift has started. Because the determination of whether to start the upshift is made by the ECU 1000 itself, the determination of whether the upshift has started is made within the ECU 1000. When the upshift has started (i.e., YES in step S110), the process proceeds to step S112. If not (i.e., NO in step S110), then step S110 is repeated.

In step S112, the ECU 1000 determines whether the predetermined period of time ΔT (UP) has passed since the upshift started. If the period of time ΔT (UP) has passed (i.e., YES in step S112), the process proceeds to step S114. If not (i.e., NO in step S112), then step S112 is repeated.

In step S114, the ECU 1000 controls at least one driving source from among the engine 100, the MG (1) 200, and the MG (2) 400 so that the output torque of the powertrain 90 increases.

Figure 10:
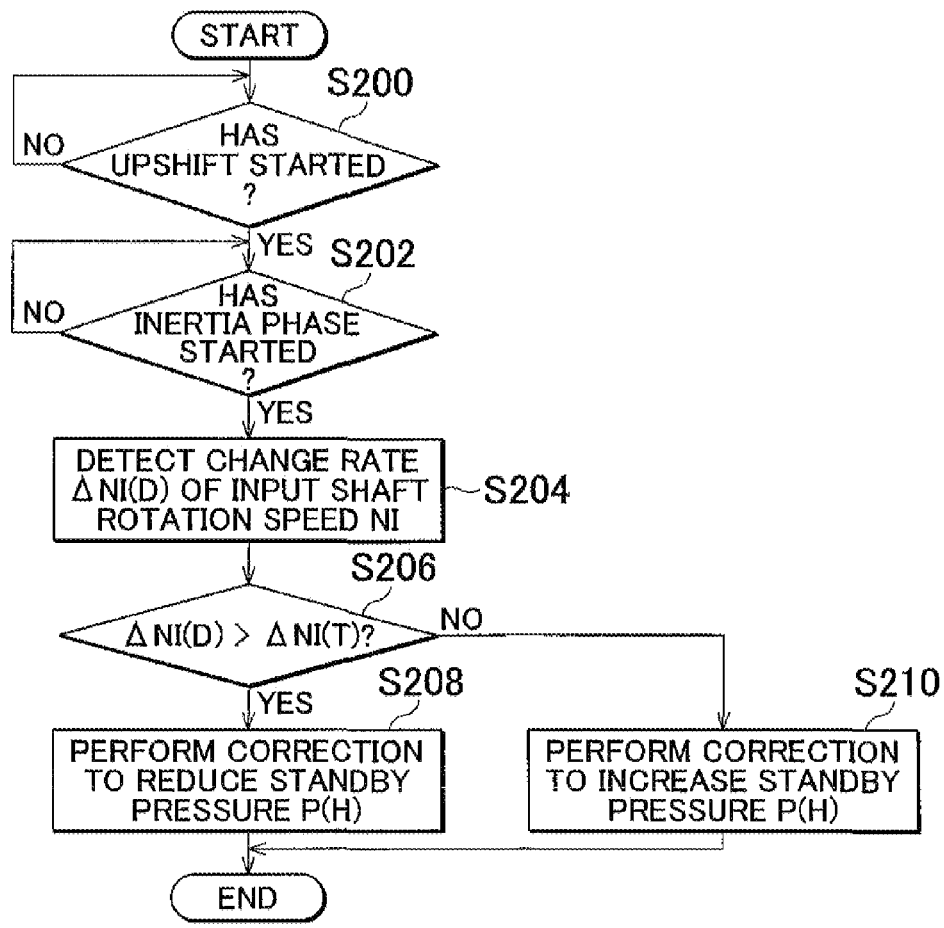
FIG. 10 is a flowchart (part 3) illustrating the control structure of a program executed by the ECU which serves as the control apparatus according to the example embodiment.

The control structure (part 3) of a program executed by the ECU 1000 which serves as the control apparatus according to this example embodiment will now be described with reference to FIG. 10.

In step S200, the ECU 1000 determines whether the upshift has started. Because the determination of whether to start the upshift is made by the ECU 1000 itself, the determination of whether the upshift has started is made within the ECU 1000. When the upshift has started (i.e., YES in step S200), the process proceeds to step S202. If not (i.e., NO in step S200), then step S200 is repeated.

In step S202, the ECU 1000 determines whether the inertia phase has started. The inertia phase is determined to have started when, for example, the input rotation speed NI has become less than the product of the output shaft rotation speed NO of the transmission 500 multiplied by the speed ratio of the low speed L. Incidentally, the method for determining that the inertia phase has started is not limited to this. If the inertia phase has started (i.e., YES in step S202), the process proceeds to step S204. If not (i.e., NO in step S202), then step S202 is repeated.

In step S204, the ECU 1000 detects the change rate of the input rotation speed NI of the transmission 500 based on a signal output from the input shaft rotation speed sensor 1040.

In step S206, the ECU 1000 determines whether the decrease rate ΔNI (D) of the input shaft rotation speed NI is greater than the target decrease rate ΔNI (T).

If the decrease rate ΔNI (D) of the input shaft rotation speed NI is greater than the target decrease rate ΔNI (T) (i.e., YES in step S206), the process proceeds to step S208. If not (i.e., NO in step S206), the process proceeds to step S210.

In step S208, the ECU 1000 corrects the standby pressure P (H) so that it becomes smaller. In step S210, the ECU 1000 corrects the standby pressure P (H) so that it becomes greater.

Figure 11:
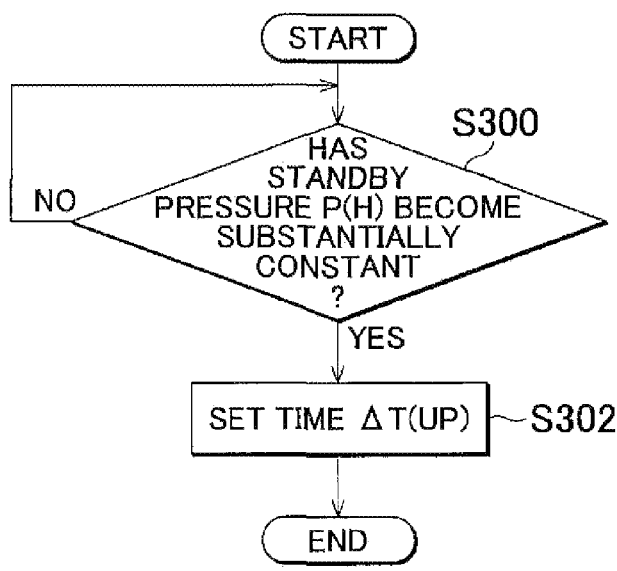
FIG. 11 is a flowchart (part 4) illustrating the control structure of a program executed by the ECU which serves as the control apparatus according to the example embodiment.

The control structure (part 4) of a program executed by the ECU 1000 which serves as the control apparatus according to this example embodiment will now be described with reference to FIG. 11.

In step S300, the ECU 1000 determines whether the standby pressure P (H) has become substantially constant (converged). For example, the standby pressure P (H) is determined to have become substantially constant (converged) when an upshift in which the difference between the decrease rate ΔNI (D) of the input shaft rotation speed NI during the inertia phase and the target decrease rate ΔNI (T) is within a preset range has been executed continuously for a preset number of times or more. When the standby pressure P (H) has become substantially constant (converged) (i.e., YES in step S300), the process proceeds to step S302. If not (i.e., NO in step S300), then step S300 is repeated.

In step S302, the ECU 1000 sets the period of time ΔT (UP) from the start of the upshift until the output torque of the powertrain 90 starts to increase, according to the standby pressure P (H). This period of time ΔT (UP) is set shorter the greater the standby pressure P (H) is.

Incidentally, in step S302, the gradient at which the output torque of the powertrain 90 is increased may also be set according to the standby pressure P (H). In this case, the gradient may be set so as to become larger the greater the standby pressure P (H) is. That is, the gradient may be set so that it is larger when the standby pressure P (H) is large than it is when the standby pressure P (H) is small.

The operation of the ECU 1000 which serves as the control apparatus according to this example embodiment, which is based on the foregoing structure and flowcharts, will now be described.

When a shift is to be performed (i.e., YES in step S100) and that shift is an upshift (i.e., YES in step S102), the upshift is started (step S104). When the upshift starts, the hydraulic pressure supplied to the brakes is controlled such that the B2 brake 562 is released and the B1 brake 561 is applied (step S106). The hydraulic pressure supplied to the B1 brake 561 is first increased to the standby pressure P (H), as described above, and is then increased further when the inertia phase starts.

Also, after the upshift starts (i.e., YES in step S110), it is determined whether a period of time ΔT (UP) has passed after the upshift started (step S112). If the period of time ΔT (UP) has passed (i.e., YES in step S112), at least one driving source from among the engine 100, the MG (1) 200, and the MG (2) 400 is controlled to increase the output torque of the powertrain 90 (step S114). As a result, the amount of decrease in the output torque during the torque phase can be reduced.

Incidentally, the shift in the transmission 500 is not limited to always being performed is a desirable state. For example, if the apply force of the B1 brake 561 is large, the shift will progress quickly. That is, the speed ratio will change quickly. On the other hand, if the apply force is insufficient due to wear of the B1 brake 561, for example, the shift will take more time. Therefore, the standby pressure P (H) of the B1 brake 561 is corrected using the change rate of the input shaft rotation speed NI during the inertia phase.

When the upshift has started (i.e., YES in step S200) and then the inertia phase starts (i.e., YES in step S202), the change rate of the input shaft rotation speed NI of the transmission 500 is detected (step S204).

If the decrease rate ΔNI (D) of the input shaft rotation speed NI is greater than the target decrease rate ΔNI (T) (i.e., YES in step S206), it means that the upshift is progressing quickly, i.e., the apply force of the B1 brake 561 is large. In this case, the standby pressure P (H) is corrected so that it becomes smaller (step S208).

On the other hand, if the decrease rate ΔNI (D) of the input shaft rotation speed NI is less than the target decrease rate ΔNI (T) (i.e., NO in step S206), it means that the upshift is progressing slowly, i.e., that the apply force is insufficient due to wear of the B1 brake 561, for example. In this case, the standby pressure P (H) is corrected so that it becomes greater (step S210). As a result, the apply force of the B1 brake 561 can be made appropriate for the upshift.

Figure 12:
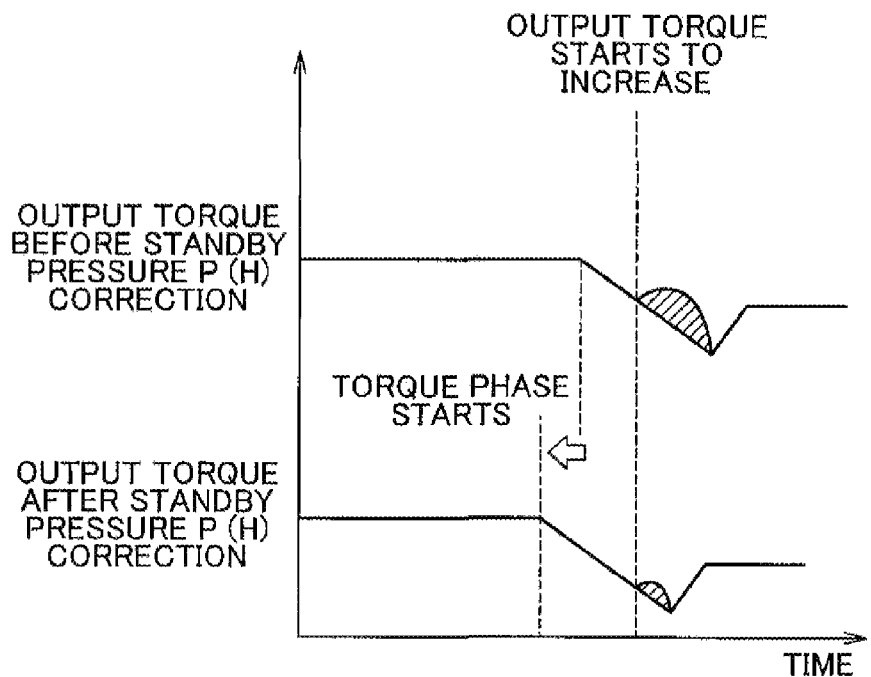
FIG. 12 is a timing chart (part 2) showing the timing at which the torque phase starts and the timing at which the output torque of the powertrain is increased.

When the standby pressure P (H) is increased, the apply force of the B1 brake 561 increases. As a result, the torque phase of the upshift starts earlier, as shown in FIG. 12. Therefore, if the period of time ΔT (UP) from the start of the upshift until the output torque of the powertrain 90 increases is constant, the output torque actually will not increase in the initial stage of the torque phase, as shown in FIG. 12.

Figure 13:
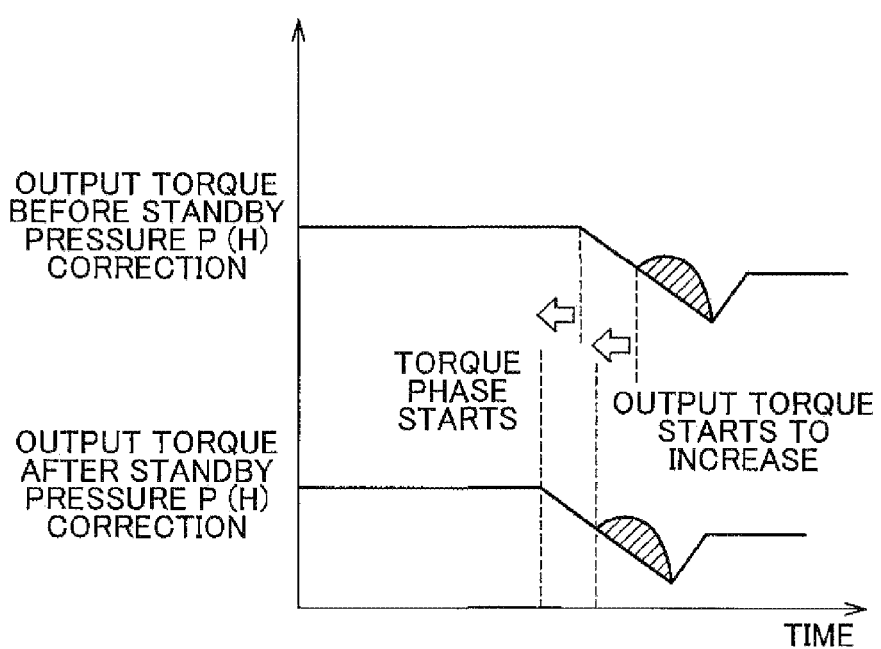
FIG. 13 is a timing chart (part 3) showing the timing at which the torque phase starts and the timing at which the output torque of the powertrain is increased.

Therefore, when the standby pressure P (H) has become substantially constant (converged) (i.e., YES in step S300), the period of time ΔT (UP) from the start of the upshift until the output torque of the powertrain 90 starts to increase is set according to the standby pressure P (H) (step S302). The period of time ΔT (UP) is set so as to become shorter the greater the standby pressure P (H) is. As a result, the lag between the time when the torque phase starts and the time when the output torque increases can be reduced, as shown in FIG. 13.

As described above, according to the ECU that serves as the control apparatus according to this example embodiment, the period of time ΔT (UP) from the start of the upshift until the output torque of the powertrain 90 starts to increase is set according to the standby pressure P (H). Accordingly, the lag between the time when the torque phase starts and the time when the output torque increases can be reduced. Therefore, the fluctuation in the output torque during the shift can be reduced, which reduces the shock (i.e., shift shock).

The example embodiment disclosed herein is in all respects merely an example and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A powertrain control apparatus comprising:
   a transmission which shifts speeds by applying a first friction apply element that is in a released state and releasing a second friction apply element that is in an applied state;
   a hydraulic pressure controlling portion which, during a shift, increases hydraulic pressure supplied to the first friction apply element to a preset standby pressure;
   a standby pressure correcting portion that corrects the standby pressure based on a state of the transmission; and
   an output torque controlling portion that controls, according to the corrected standby pressure, output torque of the powertrain during a shift in the transmission, when the corrected standby pressure has become converged, wherein
   the output torque controlling portion includes:
   a torque increasing portion that increases the output torque of the powertrain during a torque phase, during the shift in the transmission; and
   an output timing setting portion that makes a timing, at which the output torque of the powertrain starts to be increased during the torque phase, earlier when the corrected standby pressure is high than when the corrected standby pressure is low.

2. The control apparatus according to claim 1, wherein the output torque controlling portion includes an output gradient setting portion that makes a gradient, at which the output torque of the powertrain increases, larger when the corrected standby pressure is high than when the corrected standby pressure is low, in addition to that makes the timing, at which the output torque of the power train starts to be increased during the torque phase, earlier when the corrected standby pressure is high than when the corrected standby pressure is low.

3. The control apparatus according to claim 1, wherein the standby pressure correcting portion corrects the standby pressure such that the standby pressure increases when a decrease rate of an input shaft rotation speed of the transmission is less than a preset decrease rate.

4. A control method for a powertrain including a transmission which shifts speeds by applying a first friction apply element that is in a released state and releasing a second friction apply element that is in an applied state, comprising:
   increasing hydraulic pressure supplied to the first friction apply element to a preset standby pressure during a shift in the transmission that shifts speeds by applying the first friction apply element that is in a released state and releasing the second friction apply element that is in an applied state;
   correcting the standby pressure based on a state of the transmission; and
   controlling, according to the corrected standby pressure, output torque of the powertrain during a shift in the transmission, when the corrected standby pressure has become converged such that the output torque of the powertrain increases during a torque phase, during the shift in the transmission; and a timing, at which the output torque of the powertrain starts to be increased during the torque phase, is made earlier when the corrected standby pressure is high than when the corrected standby pressure is low.

5. The control method according to claim 4, wherein a gradient, at which the output torque of the powertrain increases, is made larger when the corrected standby pressure is high than when the corrected standby pressure is low, in addition to the timing, at which the output torque of the powertrain staffs to be increased during the torque phase, is made earlier when the corrected standby pressure is high than when the corrected standby pressure is low.

6. The control method according to claim 4, wherein the standby pressure is corrected such that the standby pressure increases when a decrease rate of an input shaft rotation speed of the transmission is less than a preset decrease rate.

7. A computer readable storage medium that stores a program that makes a computer execute the control method described in claim 4.

* * * * *